(No Model.)
H. WALTER.
SECONDARY BATTERY.
No. 392,244. Patented Nov. 6, 1888.
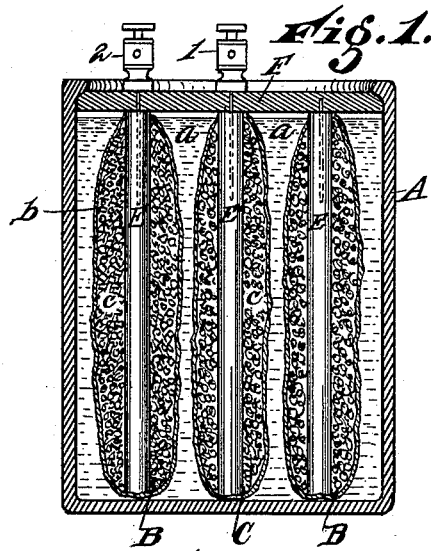
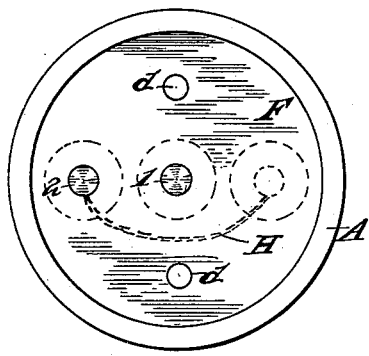
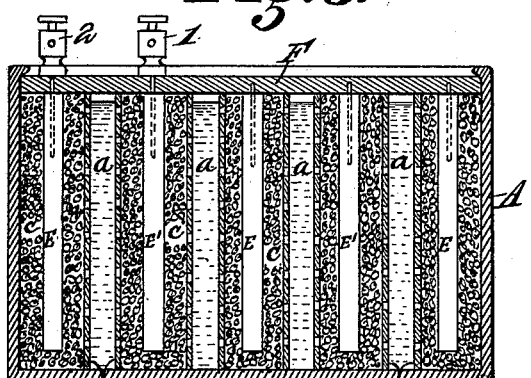
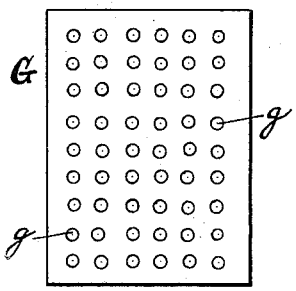
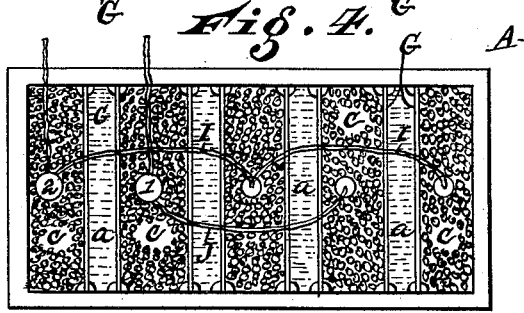
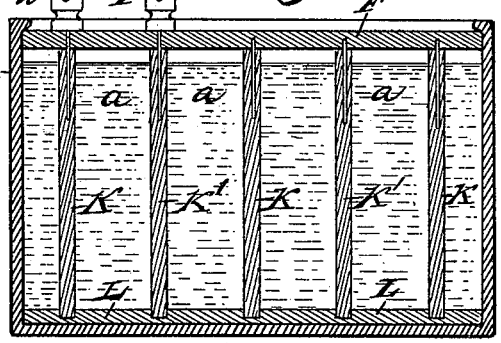
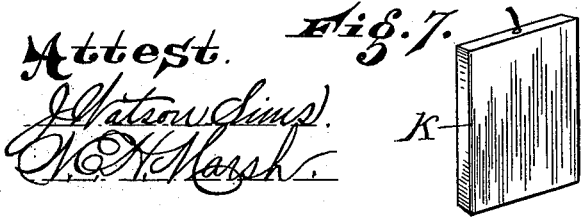
Attest.
J. Watson Sims.
W. H. Marsh.
Inventor,
Hugo Walter.
N. PETERS, Photo-Lithographer, Washington, D. C.

UNITED STATES PATENT OFFICE.

HUGO WALTER, OF CINCINNATI, OHIO, ASSIGNOR TO JAMES R. MURDOCK, OF SAME PLACE.

SECONDARY BATTERY.

SPECIFICATION forming part of Letters Patent No. 392,244, dated November 6, 1888.

Application filed August 18, 1887. Serial No. 247,282. (No model.)

*To all whom it may concern:*

Be it known that I, HUGO WALTER, a citizen of the United States, residing at Cincinnati, in the county of Hamilton and State of Ohio, have invented new and useful Improvements in the Storing of Electricity by means of Secondary or Storage Batteries, of which the following is a specification.

Heretofore the electric current has been stored in batteries holding metallic electrodes, mostly lead, and the great objection to them has been the corroding and wearing away of the electrodes and their enormous weight.

My invention consists in using electrodes which are indestructible, and therefore need no renewal, and which give a far larger surface of electrode for the reception of current-rendering material, while weighing out of all proportion less than any known storage-battery of the same capacity.

It is a well-known fact that from a solution containing a metallic salt its metal or oxide may be deposited upon any conducting matter which is placed into such a solution and in a proper manner connected with a source of electricity. Such, for instance, is the plating process. It is also true that by inserting carbons into a solution containing some material which will make the water a good conductor of the electric current, and on connecting the carbons to some source of electric current, as a primary battery or dynamo-machine, an action takes place within the liquid and upon the carbon which makes these carbon electrodes of a different potential electrically, and on disconnecting them from their feeding-source of electricity and connecting them up with some instrument demanding current for its operation the instrument will at once indicate by its working that a current flows from the carbon electrodes, and will continue it very nearly for the same length of time that the carbon electrodes received the current from the other source of electricity above mentioned. Since the capacity of a battery as to quantity depends mainly upon the surface of the electrodes exposed, I use crushed or granulated broken carbon packed tightly around a rod or block or stick of carbon, which block or stick serves to lead the current into and out of the broken or crushed carbon.

For general purposes simple blocks or plates of carbon in a solution will answer very well; but where large quantities of current are required I use the broken or crushed carbon. The surface thereby obtained becomes enormous, and the quantity of current stored and rendered in proportion.

A very powerful secondary battery may be made thus: I dissolve acetate of lead in vinegar and insert into the solution thus obtained two carbon electrodes, which I connect with a generating-source of electricity. After letting the current run into this improvised secondary battery for a certain time, I disconnect the electrodes from the generating-source and find the said carbon electrodes in a state of high difference of potential and giving out or joining them a strong electric current. They act then as the carbon and zinc electrodes do in a powerful primary battery.

In all storage-batteries known there is a deterioration from chemical wear and evaporation, which has to be always attended to, and demands much time, expense, and labor. In my invention this is reduced to a minimum, as the simple filling in of a little of the solution used will at once entirely restore the secondary battery to its greatest power. For the purpose of depolarization I use in the composition of my batteries fewer of the receiving-electrodes on the same principle as double carbon electrodes are used with a single zinc electrode in many primary batteries. A modification of the composition of the storage-battery, as hereinbefore shown, is as follows: In a storage-battery made of two carbon electrodes for one pole and one carbon electrode for the other pole, the electrodes being crushed carbon held in a porous cup or a bag of horse-hair, or asbestus, cloth, or other suitable material which the acid of the solution will not destroy, and a solution of water acidulated by one-tenth its volume of sulphuric acid and some red lead stirred into such solution, I find that when I mixed the red lead with the crushed carbon of the electrodes in the different cups or bags the secondary effects of the battery were much prompter and more lasting than in the case where the red lead was mixed in the solution. Any salt dissolved or held in a conducting solution wherein carbon electrodes are placed and fed from a source of electricity will in its electrolytic separation by the feeding-current produce a tension between the electrodes which becomes current on joining said carbon electrodes by wire or through some electric work, and the strength and duration of such current is entirely proportional to the quantity of electricity fed, the surface of carbon electrodes receiving and the conductibility of the solution surrounding said carbon electrodes. In mixing starch or flour with the liquid of the secondary battery I obtain a more solid pasty solution, preventing the spilling of the same when used where there may be motion.

Some forms of my storage-battery are illustrated in the accompanying drawings; but I do not wish to confine myself to any of the shapes shown or materials described, as carbon electrodes in a salty solution would become a secondary battery in any receptacle.

Figure I is a central section of a round cup. Fig. II is a top plan view of Fig. I. Fig. III is a central cross-section of oblong or square cup. Fig. IV is a top plan view of Fig. III, with cover removed. Fig. V is a detail view of partition-plate. Fig. VI is a central cross-section of a modification. Fig. VII is a detail perspective view of carbon.

Similar letters refer to similar parts throughout the several views.

A is a cup in Fig. I, and B B are electrodes, consisting of bags of fabric b, holding crushed carbon c tightly packed around carbon pieces E E, which are connected by wires H in Fig. II to binding-post 2. C, in Fig. I, is a similar bag connected to binding-post 1.

F is a cover holding some air-holes d d, as shown in Fig. II.

a, in Fig. I, is the salty solution surrounding the electrodes B B and C. For charging, the current is let in at 2.

Fig. III is a central cross-section of a square or oblong battery-cell, A, wherein there are perforated partitions G, the perforations of which are shown by g in Fig. V. In Fig. III the electrodes are formed by packing crushed carbon c tightly with carbon pieces E E', so as to leave a space for the solution a between all electrodes. The three electrodes having carbon pieces E E E are connected with binding-post 2, and the two electrodes having carbon pieces E' E' are connected to binding-post 1. The connecting-wires are shown in Fig. IV as I and J, said figure being a top plan view of Fig. III with cover removed.

Fig. VI is a central cross-section of a modification, where the electrodes are simply carbon blocks, sticks, or plates K K' in a solution, a, and held from shaking by mold L. The electrodes are connected to their binding-posts in the same manner as in Fig. III.

Fig. VII is a detail perspective of K in Fig. VI.

It will be seen that in order to make an all-carbon electrode operative space must be allowed for free circulation of the electrolyte between and among the particles of carbon. An attempt has been made in storage-batteries to form the electrodes of pulverized or powdered carbon; but this is not practical for the reasons given. Moreover, when the electrodes are carbon, or solid pieces of carbon, as shown in one figure of my drawings, it is convenient to support their bases in a transversely-slotted plate on the bottom of the cell, whereby lateral movement is prevented.

Having thus fully described my invention, what I claim, and desire to secure by Letters Patent, is—

1. A storage-battery having electrodes composed solely of solid, crushed, or broken carbon, sufficient space being given for the proper circulation of the electrolyte in and around the pieces of carbon composing said electrodes, substantially as specified.

2. A storage-battery having electrodes composed of broken carbon packed closely about a solid carbon piece by which the current is led in and out, sufficient space being allowed between the parts in which the broken particles composing each electrode are packed to permit circulation of the energizing-fluid or electrolyte, substantially as specified.

3. In a storage-battery, a cell having a series of compartments separated from each other by foraminous or perforated walls, said cells being filled with carbon crushed to a size to permit free circulation of the energizing-fluid, substantially as specified.

4. In a storage-battery, a cell having a transversely slotted or channeled bottom plate, and a series of carbon electrodes arranged in parallelism in said cell and having their ends resting in the transverse slots in the bottom plate thereof, substantially as specified.

HUGO WALTER.

Witnesses:
W. E. MARSH, Jr.,
W. E. H. MARSH.